Jan. 10, 1961 A. L. SMITH 2,967,398
BREAKWATER
Filed Jan. 2, 1958 2 Sheets-Sheet 1
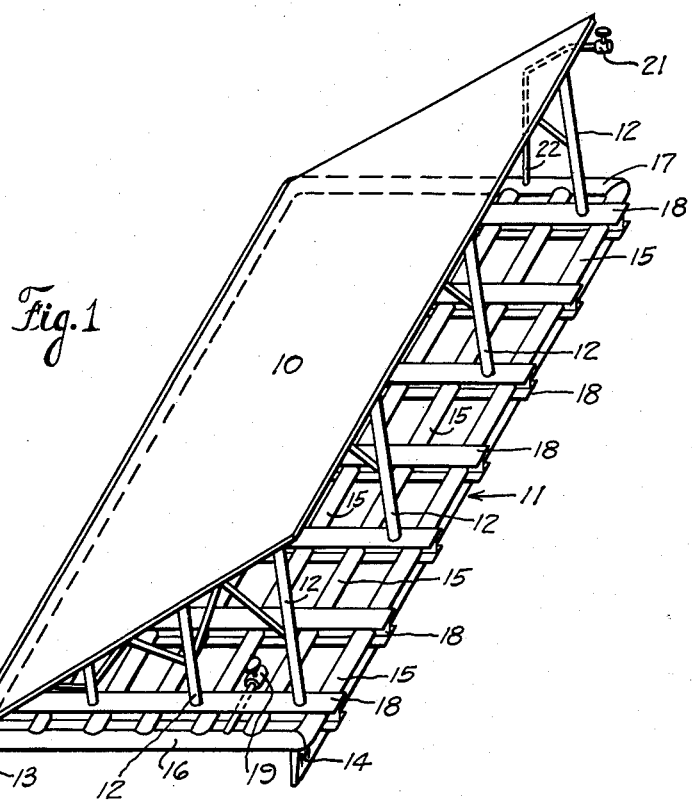
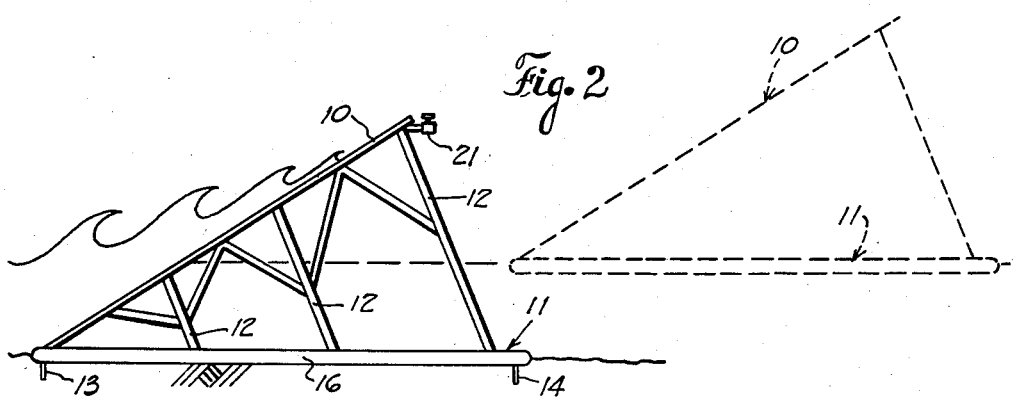
ALONZO L. SMITH
INVENTOR.
BY Vincent Martin
Jos E. Edwards
M. Harvey Gay
ATTORNEYS

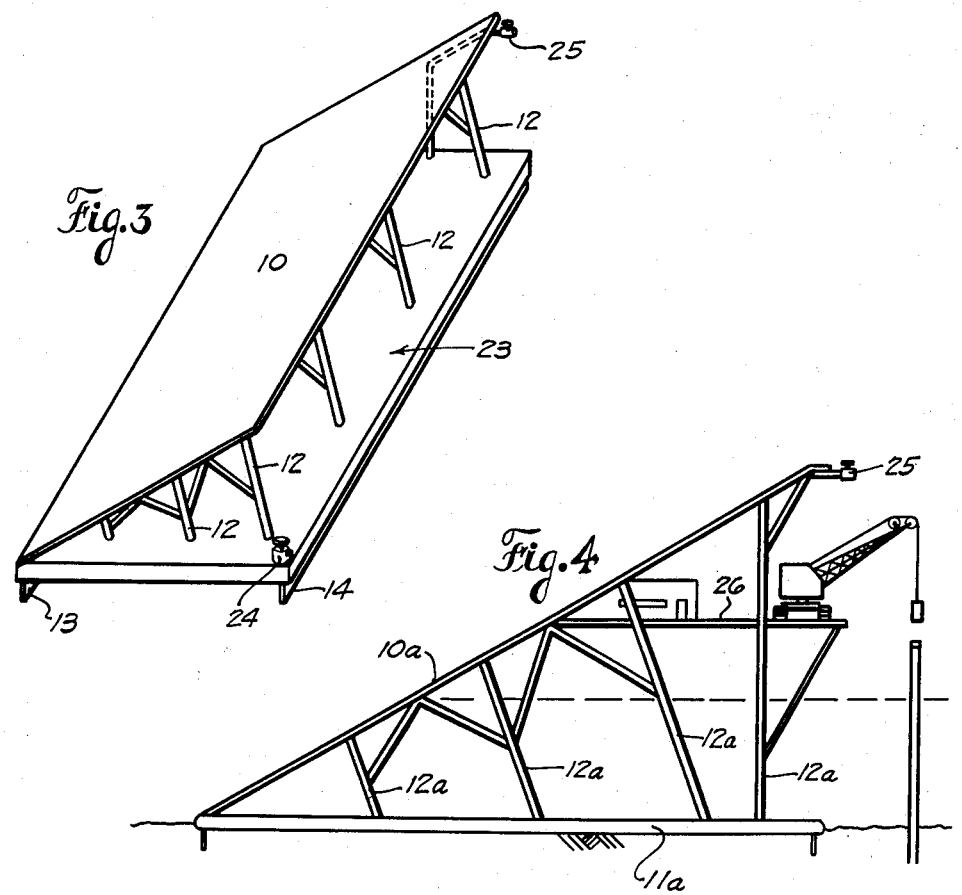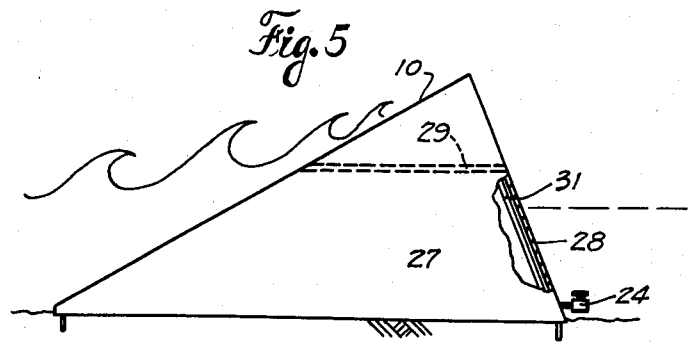

United States Patent Office 2,967,398
Patented Jan. 10, 1961

2,967,398

BREAKWATER

Alonzo L. Smith, P.O. Box 6252, Houston, Tex.

Filed Jan. 2, 1958, Ser. No. 706,696

7 Claims. (Cl. 61—5)

This invention relates to breakwaters and more particularly to breakwaters which may be used to dissipate both surface waves and under water movement.

To be completely successful, a breakwater must suppress surface waves, which have very little movement of water below the surface level, and a water movement in which mass movement is from the surface down to or near the bottom, such as waves with high crests and low troughs. Large waves are of such great force that to dissipate these waves requires many tons of weight merely to anchor previously known breakwaters in place. Any hull-type breakwater extending from the bottom to the surface will scour and roll over with water mass movement. Large surface waves will of course carry over the hull-type breakwater.

By this invention there is provided a breakwater which will dissipate all wave forces. The invention is characterized by an inclined wall which forces waves to expend their energy in climbing the wall in opposition to the force of gravity. In climbing the wall, the weight of the water is exerted downwardly on the breakwater and holds it firmly in place. As will appear below, the breakwater may be used as a separate apparatus or may be formed as a part of a working platform to protect the platform.

It is an object of this invention to expend the energy of wave masses by the use of gravity.

Another object is to dissipate waves by changing the elevation of the waves and expanding their energy along an upwardly inclined plane.

Another object of this invention is to provide a breakwater in which the weight of the waves opposed is utilized to hold the breakwater in position.

Other objects, features and advantages of the invention will be apparent from the drawings, the specification and the claims.

In the drawings wherein there are shown illustrative embodiments of this invention and wherein like reference numerals indicate like parts:

Figure 1 is a schematic illustration of one form of breakwater constructed in accordance with this invention;

Figure 2 is a view in side elevation showing in dashed lines the breakwater floating on the surface of a body of water and in solid lines resting on bottom in a position to dissipate wave action and water movement;

Figure 3 is a schematic illustration of a modified form of breakwater;

Figure 4 is a vew in side elevation of a combination breakwater and working platform constructed in accordance with this invention; and Figure 5 is a view partly in side elevation and partly in section showing a still further modified form of this invention.

Referring first to Figures 1 and 2, it will be seen that the wave dissipating means is provided by an inclined wall 10. The wall is carried on a base indicated generally at 11 which provides the desired buoyancy for floating the breakwater to location and a base for supporting the wall on bottom when the structure is sunk.

The wall 10 may be constructed from any desired material and in any desired manner which will support the forces to which it will be subjected. Preferably the fabrication of the wall is of steel with the skin suitably strengthened with structural members in the accepted manner of steel fabrication. The size of the wall 10 is of course related to the depth of the water in which it is to be used. When the breakwater is resting on bottom, the wall 10 should project above the surface a given distance as shown in Figure 2. Preferably the wall projects a sufficient distance to prevent the waves from passing over the top of the breakwater in any susbtantial amount or sufficiently to minimize the wave forces.

The wall 10 is supported on the base 11 in an inclined position by suitable support columns 12 which are preferably welded to the wall and base and suitably braced in accordance with conventional fabrication methods. It is preferred that the support columns 12 provide airtight columns and that their displacement be sufficient to permit them to function as stabilizing up-rights during the sinking or raising of the structure, as will be understood by those skilled in the art.

The wall 10 preferably overlies the base 11 with one side of the wall adjacent the base and an opposite side remote from the base so that the included angle between the base and wall is an acute angle. By positioning the wall in an overlying position relative to the base, the weight of water flowing up the wall to a level above the normal surface level will serve to weight and hold the breakwater firmly on bottom and prevent lateral shifting of the breakwater by the force of the waves.

Although the angle of inclination of the wall is subject to variation in accordance with the particular maximum wave conditions to be controlled, the angle must be such that the horizontal impact of the wave is dissipated while at the same time the weight of the wave water mass above the normal water surface is arrested and momentarily retained on that portion of the wall above the water to allow the weight of said water mass to be transmitted in a downward direction to maintain the breakwater in position. Thus, it might be said that the upper limit of the angle is at that point where the horizontal impact forces are so great that lateral movement of the breakwater would result, while the lower limit of the angle is at that point where effective dissipation of the horizontal forces cannot be produced. As shown in the drawing and as found in practical tests, the preferred angle is approximately thirty degrees.

The apparatus is also held against lateral shifting by mud fins 13 and 14 which project downwardly from base 11.

Preferably the particular base shown in Figures 1 and 2 includes a plurality of hollow tubes 15 secured at their opposite ends to headers 16 and 17 to provide air-tight buoyancy compartments. The tubes pass through a plurality of I beams 18 and are secured thereto.

A valve 19 is provided for controlling flow of fluid to and from header 16. A valve 21 controls flow of fluid to and from header 17 through a standpipe 22.

In operation, the breakwater is towed to location along the surface of the body of water, as shown in dashed outline in Figure 2. At this time the buoyancy compartments provided by the several tubes 15 will be filled with air and valves 19 and 21 will be closed. When the breakwater is on location, valves 19 and 21 are opened. Seawater will enter the base through valve 19 and will displace air from the buoyancy compartment which will exit through valve 21. As the buoyancy of the breakwater is decreased, it will slowly sink to bottom, and the base will rest on the floor of the body of water, as shown in solid lines in Figure 2. Of course the base will be positioned with the wall 10 facing into the waves so that they will climb up wall 10 and dissipate their energy in climbing the wall, as shown in Figure 2.

As soon as the breakwater is no longer needed, an air compressor may be connected to valve 21 and seawater within the base 11 displaced with air to refloat the breakwater and permit its removal to another location. Of course a pump could be connected to valve 19 and water sucked from the buoyancy compartment, or water could be pumped by a lift pump out of the base.

In Figure 3 there is shown a breakwater in which the base 11 is replaced by a closed form of base 23. The base 23 is a compartmented, barge-like structure which may be filled with air or seawater through valves 24 and 25 to raise or lower the breakwater. Other than the difference in bases, the breakwater of Figure 3 is identical to the breakwater of Figure 1.

In Figure 4 there is shown a breakwater provided with a working platform 26. Otherwise stated, Figure 4 shows a working platform which is protected by the inclined wall 10a which forms a part of the platform. The platform 26 is built on a base 11a which is identical with base 11 except that it is larger in size. The columns 12a support the inclined wall 10a and the working platform 26.

With this form of structure, it is preferred that the wall 10a extend over the platform 26 to avoid any possibility of waves being driven onto the platform and to protect the platform from inclement weather conditions. However, it will be understood that that portion of the wall 10a which overlies the platform 26 could be omitted by positioning the platform 26 at a level above that attained by waves on wall 10a.

The combination working platform breakwater may be towed to and from location and positioned on bottom in the manner previously explained.

In Figure 5 there is shown a still further form of base for use with this invention. In this breakwater, the bottom and four sides are enclosed with an impervious skin of material. The wall 10 provides one side, an endplate 27 another side, and a sidewall 28 provides a third side. The fourth side is provided by an endplate identical with endplate 27. A storage platform 29 overlies the buoyancy compartment above the normal water line. The skin of the breakwater is built about a suitable framework, one portion of which is shown at 31.

A valve 24 is provided for flooding the buoyancy compartment of this breakwater. Seawater may be removed from the compartment by a pump means attached to the valve outlet 24 or to a tailpipe extending into the buoyancy compartment.

While there have been disclosed herein a number of mobile structures, it will be understood that the same type of structure may be built at sea as a permanent structure in place or prefabricated on land and sunk permanently for use at sea.

From the above, it will be seen that all of the objects of this invention have been attained. The inclined wall has the unique advantage of being more firmly anchored in place with increasingly severe wave action. The more water that climbs wall 10 above the water level, the more dead weight applied to anchor the breakwater in place. This should be contrasted with other types of breakwaters in which increasingly severe wave action creates an increasing strain on the support means without any compensating assistance such as provided by the dead weight of water on wall 10.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A breakwater adapted to be positioned in a body of water and comprising, a solid wall, buoyancy frame means for floating the wall, a water inlet connected with the frame means for flooding the buoyancy frame means to submerge the same into engagement with the floor of the body of water, and support means for supporting the wall in an inclined position at an acute angle with respect to the floor of the body of water with the lower portion of said wall extending beneath the surface of the body of water in close proximity to the floor thereof and the upper portion of said wall projecting upwardly above the surface of said body of water, the inclination of the wall being at such an angle that waves striking said wall cause the water masses to climb said wall in opposition to the force of gravity to thereby dissipate the wave energy, the upward projection of said wall being of such height that the water masses cannot spill over the upper end of the wall whereby the weight of the water mass is transmitted in a downward direction through the wall to the floor of the body to thereby maintain the breakwater in stationary position.

2. A breakwater adapted to be positioned in a body of water and comprising, a hollow base providing sufficient buoyancy to permit floating of the breakwater, inlet means for admitting water into the base to reduce its buoyancy and permit sinking of the base into engagement with the floor of said body of water, and a solid wall carried by the base and forming therewith an acute angle with opposite inclined ends of the wall approximately overlying the opposite extremities of the base and closer to one of said extremities of the base than the other, the upper portion of the wall projecting upwardly above the water surface a sufficient distance to cause the waves striking the same to expand their energy in climbing the wall in opposition to the force of gravity, the maximum height of the upwardly projecting wall being so related to the waves being interrupted that the water masses of said waves cannot spill over the upper end of the wall, whereby said water masses are momentarily arrested on the wall and the weight thereof is transmitted in a downward direction through the wall to the base to maintain the breakwater in stationary position.

3. A breakwater adapted to be positioned in a body of water comprising, a hollow base providing sufficient buoyancy to permit floating of the breakwater, inlet means for admitting water into the base to reduce its buoyancy and permit sinking of the base into engagement with the floor of said body of water, an inclined solid wall overlying the base and having its lower edge portion positioned adjacent and secured to the base and the opposite upper edge portion positioned at a spaced point from the base to provide a wall which is disposed at an acute angle relative to the bottom of the body of water and which will extend from adjacent the bottom of said body of water to a predetermined distance above its surface, the upper portion of the wall projecting upwardly above the water surface a sufficient distance to cause the waves striking the same to expend their energy in climbing the wall in opposition to the force of gravity, the maximum height of the upwardly projecting wall being so related to the waves being interrupted that the water masses of said waves cannot spill over the upper end of the wall, whereby said water masses are momentarily arrested on the wall and the weight thereof is transmitted in a downward direction through the wall to the base to maintain the breakwater in stationary position, and a working platform mounted on the protected side of said inclined wall.

4. Apparatus for use in offshore operations within a body of water comprising, a hollow base providing sufficient buoyancy to permit floating of the apparatus, inlet means for admitting water into the base to reduce its buoyancy and permit sinking of the base into engagement with the floor of said body of water, a working platform carried by the base and positioned a sufficient distance thereabove to be above the surface of said body of water when the base is resting on bottom, and an inclined solid wall carried by the base which is disposed at an acute angle relative to said base and which extends upwardly from one side of the base and in overlying relationship to said platform, whereby the upper portion of said wall is a substantial distance above the surface of the body of water, the upper portion of the wall projecting upwardly above the water surface a sufficient distance to cause the waves striking the same to expand their energy in climbing the wall in opposition to the force of gravity, the maximum height of the upwardly projecting wall being so related to the waves being interrupted that the water masses of said waves cannot spill over the upper end of the wall, whereby said water masses are momentarily arrested on the wall and the weight thereof is transmitted in a downward direction through the wall to the base to maintain the breakwater in stationary position.

5. A breakwater adapted to be positioned in a body of water including, a normally buoyant supporting frame, a solid wall member, means for mounting said wall member on the frame, means connected with the supporting frame for water-flooding the supporting frame to submerge one end portion of the wall member into a position closely adjacent the floor of the body of water, the mounting of the wall member on the support and the size of said member being such that when the supporting frame is resting on the floor of a body of water and said one end portion of the wall is submerged, the remainder of the wall extends upwardly at an inclination with its upper portion projecting a substantial distance above the surface of the body of water, the angle of inclination of said wall being acute and causing the waves striking the same to expend their energy in climbing the wall in opposition to the force of gravity, the maximum height of the wall being so related to the height of the waves being interrupted that the water masses of said waves cannot spill over the upper end of the wall to thereby cause the weight of the water which is arrested by said wall to be transmitted in a downward direction through the supporting frame and against the floor of said body of water to assure that the supporting frame and wall remain in a stationary position.

6. A breakwater for blocking wave action which is floatable into position and adapted to be submerged in a body of water comprising, a buoyant supporting frame and an inclined solid wall mounted on the frame, means connected with the frame for water-flooding the frame to submerge said frame and one end portion of the wall to a position on the bottom of the body of water, said submergence disposing the wall at an acute inclination in facing relationship to the wave action with the upper end portion projecting a substantial distance above the maximum height of waves striking the wall, the inclination of the solid wall causing the waves to expend the energy of the wave mass above the water's surface by the force of gravity to the ocean floor through the supporting structure.

7. A movable breakwater which is movable to a desired location and positionable in a body of water comprising, a buoyant supporting frame, a solid wall member, means for mounting said wall member on the supporting frame at an acute angle with respect to the bottom of the body of water in which the supporting frame and wall are positioned, means connected with the frame for flooding and submerging the frame to a position on the bottom of a body of water, said wall extending upwardly a substantial distance above the maximum height of waves striking the wall, the angle of inclination of said wall being such as to cause the waves striking the same to expend their energy in climbing said wall in opposition to the force of gravity and to cause the weight of water which is arrested by said wall to be transferred downwardly through the wall and supporting frame to the floor of said body of water to maintain said wall and support in a stationary position.

References Cited in the file of this patent

UNITED STATES PATENTS

| | | |
|---|---|---|
| 335,032 | Leeds | Jan. 26, 1886 |
| 346,140 | Bates | July 7, 1886 |
| 799,708 | Boyce | Sept. 19, 1905 |
| 2,014,116 | Powers | Sept. 10, 1935 |
| 2,584,867 | Guarin | Feb. 5, 1952 |
| 2,699,042 | Hayward | Jan. 11, 1955 |

FOREIGN PATENTS

| | | |
|---|---|---|
| 8,038 | Great Britain | June 16, 1886 |